United States Patent
Skriletz

(10) Patent No.: US 8,386,999 B2
(45) Date of Patent: Feb. 26, 2013

(54) METHOD AND SYSTEM FOR ANALYZING A SOFTWARE DESIGN

(75) Inventor: Richard A. Skriletz, Portland, OR (US)

(73) Assignee: InfoNovus Technologies, LLC, Portland, OR (US)

( * ) Notice: Subject to any disclaimer, the term of this patent is extended or adjusted under 35 U.S.C. 154(b) by 1199 days.

(21) Appl. No.: 12/189,290

(22) Filed: Aug. 11, 2008

(65) Prior Publication Data

US 2009/0100401 A1    Apr. 16, 2009

Related U.S. Application Data

(60) Provisional application No. 60/954,927, filed on Aug. 9, 2007.

(51) Int. Cl.
*G06F 9/44* (2006.01)

(52) U.S. Cl. .................................................... 717/104

(58) Field of Classification Search ................. 717/100, 717/104
See application file for complete search history.

(56) References Cited

U.S. PATENT DOCUMENTS

| | | | |
|---|---|---|---|
| 5,875,330 A | 2/1999 | Goti | |
| 5,875,333 A | 2/1999 | Fish et al. | |
| 6,349,404 B1 | 2/2002 | Moore et al. | |
| 6,389,588 B1 | 5/2002 | Wadhwa et al. | |
| 6,473,748 B1 | 10/2002 | Archer | |
| 6,601,233 B1 | 7/2003 | Underwood | |
| 6,721,941 B1 | 4/2004 | Morshed et al. | |
| 6,757,887 B1 * | 6/2004 | Kaplan et al. | 717/106 |
| 6,789,252 B1 | 9/2004 | Burke et al. | |
| 6,889,371 B1 | 5/2005 | Teig et al. | |
| 6,889,375 B1 | 5/2005 | Chan et al. | |
| 6,898,783 B1 | 5/2005 | Gupta et al. | |
| 7,047,518 B2 * | 5/2006 | Little et al. | 717/108 |
| 7,114,149 B2 | 9/2006 | Aptus et al. | |
| 7,197,739 B2 | 3/2007 | Preston et al. | |
| 7,213,232 B1 * | 5/2007 | Knowles | 717/121 |
| 7,346,888 B1 | 3/2008 | Srinivasan et al. | |
| 7,424,701 B2 | 9/2008 | Kendall et al. | |
| 7,496,888 B2 * | 2/2009 | Sanjar et al. | 717/105 |
| 7,533,366 B2 | 5/2009 | Gupta et al. | |
| 7,543,274 B2 | 6/2009 | Hinchey et al. | |
| 7,640,251 B2 | 12/2009 | Sundararajan et al. | |
| 7,694,272 B2 | 4/2010 | Bronicki et al. | |
| 7,730,446 B2 | 6/2010 | Anonsen et al. | |
| 7,752,606 B2 | 7/2010 | Savage | |
| 7,886,041 B2 | 2/2011 | Outhred et al. | |
| 7,890,924 B2 * | 2/2011 | Raffo | 717/105 |
| 7,945,892 B1 | 5/2011 | Kainz et al. | |
| 8,001,527 B1 | 8/2011 | Qureshi et al. | |
| 8,006,224 B2 | 8/2011 | Bateman et al. | |
| 8,015,541 B1 | 9/2011 | Srinivasan et al. | |

(Continued)

OTHER PUBLICATIONS

Mano, Nobuoki, Modeling of Data-Processing Software for Generating and Reusing Their Programs, IEEE, 1988, pp. 231-240.

(Continued)

*Primary Examiner* — Li B Zhen
*Assistant Examiner* — Ryan Coyer
(74) *Attorney, Agent, or Firm* — Holland & Knight LLP; Brian J. Colandreo, Esq.; Michael T. Abramson, Esq.

(57) ABSTRACT

A method and system of analyzing a software design includes receiving one or more specifications containing one or more design elements. One or more design elements not included in the one or more specifications are identified. One or more design elements not included in the one or more specifications are generated. The one or more generated design elements are added to the one or more specifications.

12 Claims, 2 Drawing Sheets

U.S. PATENT DOCUMENTS

| | | | |
|---|---|---|---|
| 8,024,703 | B2 | 9/2011 | Gerken et al. |
| 8,086,995 | B2 | 12/2011 | Luo et al. |
| 8,103,536 | B2 | 1/2012 | Green et al. |
| 8,117,597 | B2 | 2/2012 | Shia |
| 8,176,465 | B2 * | 5/2012 | Dutta et al. ............ 717/104 |
| 2002/0091989 | A1 | 7/2002 | Cole et al. |
| 2004/0111428 | A1 | 6/2004 | Rajan et al. |
| 2005/0033588 | A1 | 2/2005 | Ruiz et al. |
| 2005/0144226 | A1 | 6/2005 | Purewal |
| 2005/0172263 | A1 | 8/2005 | Hariharan et al. |
| 2005/0172270 | A1 | 8/2005 | Dathathraya et al. |
| 2005/0210099 | A1 | 9/2005 | Oswalt |
| 2005/0235260 | A1 | 10/2005 | Matsutsuka et al. |
| 2007/0089103 | A1 * | 4/2007 | Iborra et al. ............ 717/141 |
| 2008/0040364 | A1 | 2/2008 | Li |

OTHER PUBLICATIONS

Solsi, et al., Simple Yet Complete Heuristics for Transforming Data Flow Diagrams into Booch Style Diagrams, Ada Letters, Mar./Apr. 1991, vol. XI, No. 2, pp. 115-127.

Conradi, et al., Information Model of a Compound Graph Representation for System and Architecture Level Design, IEEE, 1995, pp. 22-27.

Ray, Arnab, Architectural Interaction Diagrams: AIDs for System Modeling, IEEE, 2003, pp. 396-406.

Ji, et al., Interactive Software Architecture Design with Modeling & Simulation, ACM, 2004, pp. 305-306.

Abdi, et al., Automatic Generation of Equivalent Architecture Model from Functional Specification, ACM, 2004, pp. 608-613.

Abdi, et al., On Deriving Equivalent Architecture Model from System Specification, IEEE, 2004, pp. 322-327.

Ge, et al., An Architecture Modeling and Code Generation Framework for Configuration Management Systems, ACM, 2005, pp. 427-428.

Liu, et al., Mapping Concern Space to Software Architecture: A Connector-Based Approach, ACM, 2005, 5 pgs.

Mahfoudhi, et al., Towards a User Interface Generation Approach Based on Object Oriented Design and Task Model, ACM, 2005, pp. 135-142.

International Preliminary Report on Patentability with Written Opinion, mailed Feb. 24, 2011, 7 pgs.

Rueher, et al., "Capturing Software Processes Through the Generated Objects," ISPW 1988 Proceedings of the 4th International Software Process Workshop on Representing and Enacting the Software Process, pp. 148-152.

International Search Report and Written Opinion of the International Searching Authority, mailed Sep. 24, 2009 (9 pgs.).

Jiang et al, "Comparing design and code metrics for software quality prediction", ACM Promise, pp. 11-18, 2008.

Matinlassi, "Comparison of software product line architecture design methods: COPA, FAST, FORM, KobrA and QADA", IEEE ICSE, pp. 1-10, 2004.

Popovici et al., "Platform-based software design flow for heterogeneous MPSoC", ACM Trans. on Embedded Sys. vo. 7, No. 4, article 39, pp. 1-23, 2008.

Oyamada et al., "Software performance estimation in MPSoC Design", IEEE, pp. 38-43, 2007.

Guglielmo et al., "Model-driven design and validation of embedded software", ACM AST, pp. 98-104, 2011.

Jensen et al., "On the use of genetic programming for automated refactoring and the introduction of design patents", ACM GECCO, pp. 1341-1348, 2010.

* cited by examiner

METHOD AND SYSTEM FOR ANALYZING A SOFTWARE DESIGN

RELATED APPLICATION

This application claims the priority of U.S. Provisional Application No. 60/954,927, filed on 9 Aug. 2007, which is incorporated here by reference in its entirety.

TECHNICAL FIELD

This disclosure relates to software, more particularly to capturing a software application as a specification.

BACKGROUND

The construction of software applications is time intensive and resource heavy. Companies often hire software developers to create and maintain software applications for use within their environment. For example, a manager in a medical facility may wish to utilize an application that automates the scheduling of medical procedures in order to save time and money. However, the manager may find that no suitable commercial application exists. In order to procure a suitable application, the manager and the medical facility may be forced to develop their own, custom application by hiring software developers to create the application.

Software such as an application that automates the scheduling of medical procedures may exist as part of a larger design definition that incorporates the actions of patients, doctors, and medical staff. The actions of non-application software entities and factors are an important aspect of the design definition that can affect the design of the application software, yet these are often excluded from application software requirements. Further, measurements of operational activities contained in the design definition, necessary for analysis and evaluation, may also be aspects of a design definition that may be excluded from application software requirements.

The software development process will likely include, at a minimum, a specification capture phase where software requirements are gathered, a development phase where the software is written, and a test phase where the software is tested. The process is time consuming and costly, especially, as is the case, where a company has a need for multiple custom applications or requires modifications to a custom application. The natural result of the process will likely be a custom software application tailored to a specific need, but not one that is flexible or re-usable; the company will have to invest additional time and resources to make any changes to the custom application or to create a new application.

A system and method that can analyze a design definition which has been reduced to data, identify measurements of operational activities contained in the design definition, and modify the design definition to include those measurements such that the design definition can be used to generate application software that includes the identified measurements may speed the development cycle and require fewer resources to produce more flexible, re-usable results.

SUMMARY OF DISCLOSURE

In an embodiment, a method of analyzing a software design includes: receiving one or more specifications containing one or more design elements; identifying one or more design elements not included in the one or more specifications; generating the one or more design elements not included in the one or more specifications, thus defining one or more generated design elements; and adding the one or more generated design elements to the one or more specifications.

One or more of the following features may be included. The one or more specifications may be stored. Identifying design elements not included in the specification may include: analyzing event triggers associated with one or more process actions; analyzing data captured by one or more process actions; generating metrics associated with data captured by one or more process actions; and generating metrics associated with design elements of the specification. A determination may be made regarding whether the one or more generated design elements exist within the specification. Determining whether the one or more generated design elements exists within the specification may include: determining whether data of the one or more generated design elements exists within the specification; determining whether a process action of the one or more generated design elements exists within the specification; determining whether a user interface definition of the one or more generated design elements exists within the specification; and determining whether rules of the one or more generated design elements exists within the specification. Generating the one or more generated design elements may include at least one of: generating one or more process action definitions; generating one or more data definitions; generating one or more user interface definitions; and generating one or more rules.

In another embodiment, a computer program product resides on a computer readable medium, having a plurality of instructions stored thereon which, when executed by a processor, cause the processor to perform operations including: receiving one or more specifications containing one or more design elements; identifying one or more design elements not included in the one or more specifications; generating the one or more design elements not included in the one or more specifications, thus defining one or more generated design elements; and adding the one or more generated design elements to the one or more specifications.

One or more of the following features may be included. The one or more specifications may be stored. Identifying design elements not included in the specification may include: analyzing event triggers associated with one or more process actions; analyzing data captured by one or more process actions; generating metrics associated with data captured by one or more process actions; and generating metrics associated with design elements of the specification. A determination may be made regarding whether the one or more generated design elements exist within the specification. Determining whether the one or more generated design elements exists within the specification may include: determining whether data of the one or more generated design elements exists within the specification; determining whether a process action of the one or more generated design elements exists within the specification; determining whether a user interface definition of the one or more generated design elements exists within the specification; and determining whether rules of the one or more generated design elements exists within the specification. Generating the one or more generated design elements may include at least one of: generating one or more process action definitions; generating one or more data definitions; generating one or more user interface definitions; and generating one or more rules.

BRIEF DESCRIPTION OF THE DRAWINGS

Like numbers denote like elements in the drawings.

DETAILED DESCRIPTION OF THE PREFERRED EMBODIMENTS

Overview:

As will be discussed in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, byte-code, script code, markup language code, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include: a semiconductor or solid state memory, magnetic tape, a removable computer diskette, a random access memory (RAM), a read-only memory (ROM), a flash memory, a rigid magnetic disk, and an optical disk. Current examples of optical disks may include, but are not limited to, compact disc read only memory (CD-ROM), compact disc read/write (CD-R/W), DVD read only memory (DVD-ROM), and DVD read/write memory (DVD-RW).

A data processing system and/or computing device suitable for storing and/or executing program code may include at least one processor coupled directly or indirectly to memory elements through a system bus. The memory elements may include local memory employed during actual execution of the program code, bulk storage, and cache memories.

Input/output or I/O devices (including but not limited to keyboards, displays, pointing devices, voice recognition, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
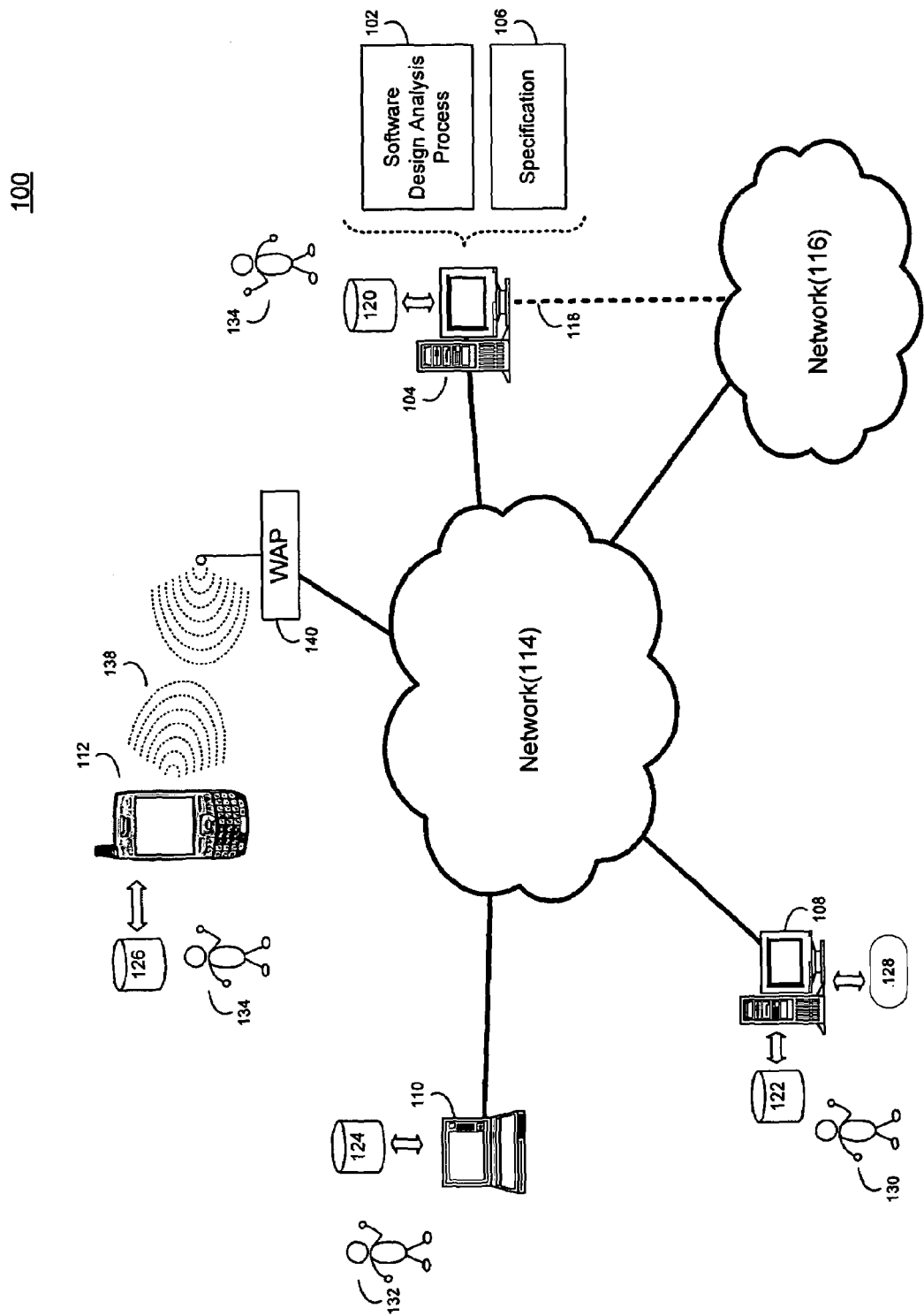
FIG. 1 is a diagrammatic view of a software design analysis process executed in whole or in part by a computer coupled to a distributed computing network.

Referring to FIG. 1, FIG. 1 depicts a method and system 100 for analyzing a software design. Software design analysis process 102, which may be resident on and executed (in whole or in part) by server computer 104, is shown and may be operative to analyze a software design. As will be discussed in greater detail, software design analysis process 102 may analyze and/or modify a software design included in specification 106.

Server computer 104 may be a single server computer, a plurality of server computers, or a general purpose computer, for example. Software design analysis process 102 may be resident on and executed by server computer 104 (as shown in FIG. 1), or on desktop computer 108, laptop computer 110, and/or computing device 112. Software design analysis process 102 may be wholly or partially resident on any computing device or any combination of computing devices including, but not limited to, desktop computer 108, laptop computer 110, computing device 112, and/or server computer 104, etc. Software design analysis process 102 may also be resident on and executed by any type of computing device including, but not limited to, a laptop computer, desktop computer, server computer, personal digital assistant (PDA), smart-phone, cellular telephone, cable box, television, gaming console, office telephone, MP3 player, calculator, tablet PC, supercomputer, mainframe, minicomputer, bar code reader, RFID devices, or any other type of computing device. As will be discussed below in greater detail, software design analysis process 102 may analyze specification 106.

Server computer 104 may be coupled to distributed computing network 114 (e.g., a LAN, a WAN, and/or the Internet). Server computer 104 may be, for example, a web server running a network operating system, examples of which may include but are not limited to Microsoft Windows XP Server™, Unix™, OS/X™, or Redhat Linux™.

Network 114 may be coupled to one or more secondary networks (e.g., network 116), such as: a local area network; a wide area network; an internet; the World Wide Web; or an intranet, for example. Additionally/alternatively, server computer 104 may be coupled to network 114 through secondary network 116, as illustrated with phantom link line 118. Although not shown, any computing device may also be coupled to network 114 through secondary network 116 through a link line, such as phantom link line 118.

The instructions and subroutines of software design analysis process 102, which may be stored on storage device 120 coupled to server computer 104, may be executed by one or more processors (not shown) and one or more memory architectures (not shown) incorporated into server computer 104. Additionally, the instructions and subroutines of software design analysis process may be stored wholly or partially on storage devices 122, 124, 126. Storage devices 120, 122, 124, 126 may include, but are not limited to, hard disk drives, tape drives, optical drives, RAID arrays, random access memories (RAM), read-only memories (ROM), compact flash (CF) storage devices, secure digital (SD) storage devices, memory stick storage devices, CDs, DVDs, etc. The instructions and subroutines of software design analysis process 102 may cause one or more computer processors (not shown) to perform operations based on the instructions and subroutines.

Software design analysis process 102 may also access and make use of a data store, such as data store 128 coupled to desktop computer 108. Data store 126 may be a database, which may reside in a file or files on desktop computer 108. Desktop computer 108 may execute database software such as Microsoft SQL Server™, mySQL™ or Oracle Database 11g™, or any other form of database. Alternatively, data store 128 may be a custom database, such as a flat file database or an XML database. Although FIG. 1 depicts data store 128 coupled to desktop computer 108, data store 128 may reside on and/or be coupled to any computing device including, but not limited to: server computer 104, laptop computer 110, computing device 112, and/or any other computing device. Software design analysis process 102 may access data store 128 remotely through networks 114, 116, or directly if data store 128 is resident on a computing device local to software design analysis process 102. Although not shown, software design analysis process 102 may access multiple data stores (not shown). The multiple data stores may be resident on a single computing device or on a plurality of computing devices.

Users, such as users 130, 132, 134, 136, may access software design analysis process 102 locally, directly through network 114, or through secondary network 116 by interfacing with server computer 104, desktop computer 108, laptop computer 110, computing device 112, or any other computing device, for example. Users 130, 132, 134, 136 may also access software design analysis process 102 through a local computing device. Software design analysis process 102 may include one or more user interfaces, such as textual or graphical user interfaces, through which users 130, 132, 134, 136 may access software design analysis process 102.

The computing devices (e.g., server computer 104, desktop computer 108, laptop computer 110, and computing device 112) may be physically or wirelessly coupled to network 114 (or network 116). For example, server computer 104 is shown directly coupled to network 114 via a hardwired network connection. Desktop computer 108 is also shown directly coupled to network 114 via a hardwired network connection. Computing device 112 is shown wirelessly coupled to network 114 via wireless communication channel 138 established between computing device 112 and wireless access point ("WAP") 140, which is shown directly coupled to network 114. WAP 140 may be, for example, an IEEE 802.11a, 802.11b, 802.11g, 802.11n, Wi-Fi, and/or Bluetooth device that is capable of establishing wireless communication channel 138 between computing device 112 and WAP 140.

Figure 2:
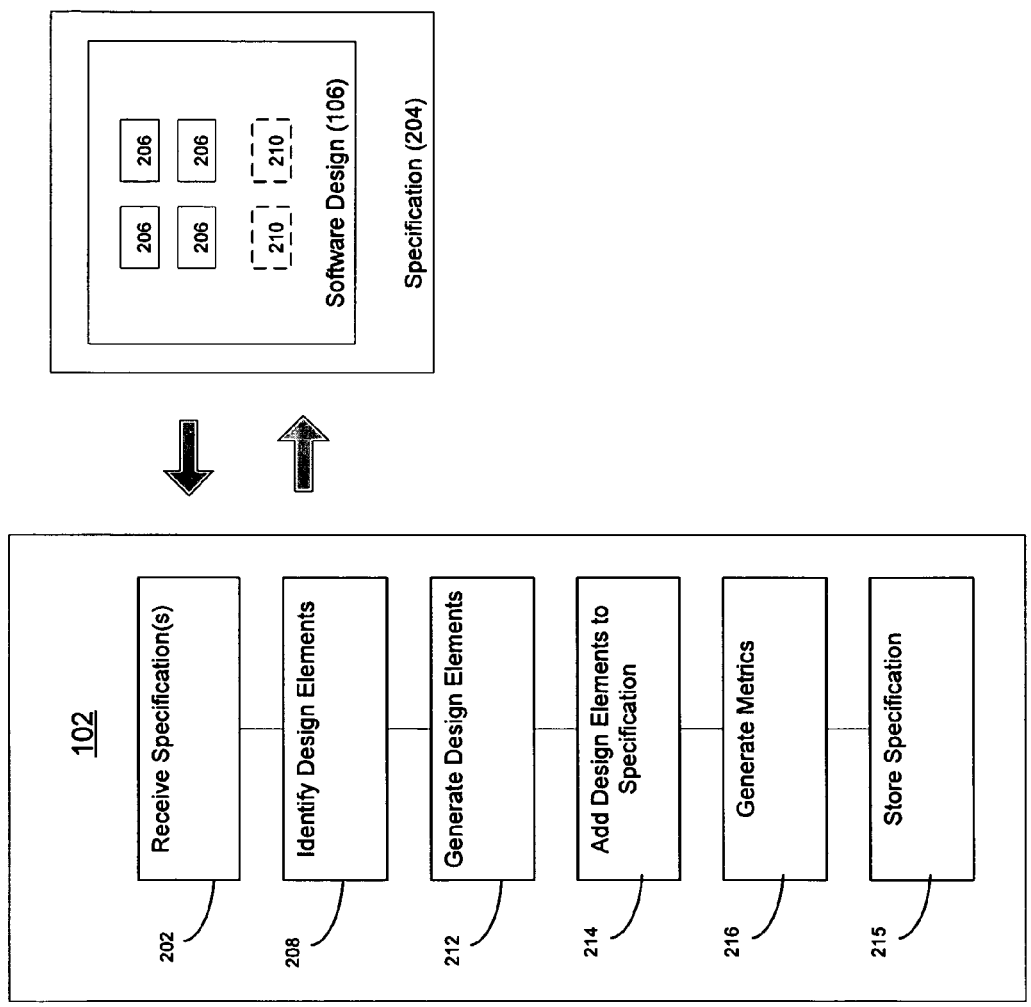
FIG. 2 is a flowchart overview of the software design analysis process of FIG. 1.

The Software Design Analysis Process:

Referring also to FIG. 2, software design analysis process 102 may receive one or more specifications 204 containing one or more design elements 206, identify 208 one or more design elements 210 not included in the one or more specifications, generate 212 the one or more design elements 210 not included in the one or more specifications, and add 214 the one or more generated 212 design elements to the one or more specifications 204. Software design analysis process may also store 215 specification 204 including the generated design elements 210.

Software design analysis process 102 may receive 202 one or more specifications, such as specification 204, that describe, at least in part, a software design. Application construction process 102 may also receive 202 multiple specifications 204. A specification may include data, documents, files, text, a propagated signal, a stream, or any form of data or information. Specification 204 may be captured through a separate mechanism and reduced to set of data that describes, in part, requirements for performing work to accomplish a goal. Specification 204 may also be used to automatically generate a software application. For example, specification 204 may include data, rules, user interface definitions, process actions, etc. so that a software application may be automatically generated from software design 106 and/or design elements 206.

A specification, such as specification 204, may include, at least in part, requirements for a software application. As such, specification 204 may include one or more software designs 106. A software design may include the requirements, rules, information, data, etc. that describes a software application. A software design may also include an architecture, a purpose, a goal, and/or any other aspect of a software design that describes a software application. A software design may be an idea or concept (such as an idea for a software application within the mind of a software designer) that has been tangibly captured as at least part of specification 204. The software design may, for example, include design elements 206, captured as part of specification 204, that describe a software application. Specification 204 may include, for example, design elements 206 that describes at least part of a software application to be built and how the software application will support or achieve a required goal. For example, specification 204 may include, among other elements, actions to be performed by the software application. The actions to be performed by the software application may be included in design elements 206, for example. Additionally or alternatively, specification 204 may include requirements and specifications for a process or method. The requirements and specifications for a process or method may also be included in design elements 206. For example, specification 204 may define, in part, operating goals (i.e., an operating goal of scheduling operations in a medical facility, or the goal of communicating to a group of individuals in an organization, for example) and/or a process or method to achieve those goals (i.e., one or more process actions, user interface definitions, and/or rules that may be used to schedule medical procedures and/or communicate to a group of individuals, for example). Further, specification 204 may contain, in part, other descriptions and/or definitions of an operation or a software application including, but not limited to, definitions of physical facilities, organizational charts, policies, functions, and/or communication standards. In an embodiment, specification 204 may define (e.g. within design elements 206), in part, operating goals (e.g., an operating goal of maintaining the processing conditions of a refinery within standards for flow rates, pressures, and temperatures) and/or a process or method to achieve those goals, (e.g., one or more process actions, user interface definitions, and/or processing rules that may be used to monitor and adjust the processing conditions of the refinery and/or communicate to a group of individuals, for example). Further, specification 204 may contain, in part, descriptions and/or definitions of a software application including, but not limited to, definitions of processing functions, components to monitor, the location and nature of sensors, and so forth.

In a preferred embodiment, specification 204, may take the form of one or more electronic files containing specifications and/or design elements which may define the software application. A specification may also take other forms, such as a data stream, web service, database, XML file, HTML file, physical printout, transmission, or any other form of data or information that may describe a software application.

As stated, software application construction process 102 may receive 202 specification 204. Receiving 202 specification 204 may include loading all or part of the specification into a memory, such as a memory (not shown) coupled to server computer 104.

Specification 204 may include design elements, such as design elements 206. Design elements 206 may be atomic data, information, elements, processes, rules, and/or relationships, the collection of which make up, at least in part, specification 204. Design elements 206 may include a process definition that defines, at least in part, a process which employs the associated software application. The software application may include the process steps which may be part of the process defined by design elements 206. For example, a software application that supports the process of managing a medical facility's schedule may include process actions for scheduling a medical procedure. Alternatively, the software application may be or become part of the process defined by design elements 206. For example the process of scheduling a medical procedure within a medical organization may include or incorporate a software application that updates a calendar as part of the process of scheduling a medical procedure. A process associated with the software application may also include a process or method used within an operation, i.e. an operational process. An operational process may include work actions procedures, and/or methods, for example, that may be used to achieve an operating goal. For example, a particular operating process may define the scheduling of a medical procedure. Design elements 206 may contain information that defines the scheduling process. Continuing the example, the information contained within design elements 206 may include information such as goals of the scheduling process (such as a minimum target of scheduled procedures), descriptions of the process, information about the process (such as commonly asked questions and answers), definitions of data used in the process such as types of patients, types of doctors, types of medical procedures, types of insurance, levels of care, procedure calendars, necessary forms, legal requirements, or any other information pertaining to the scheduling of a medical procedure.

Design elements 206 may also include process actions that define, at least in part, actions associated with a process, such as a process implemented in software, for example. A process action definition may also include information about the type of each process action. For example, a process action may be an action performed by a person alone, performed by a person using a computer, performed by a computer alone, performed by a person using a mobile device, etc. Although not required, the process actions may also define a sequence in which the actions are to take place in order to meet a goal of the software application. In the example of a medical procedure, process actions may include, but are not limited to: gathering patient information, which may be an action performed by a person using a computer, setting a date and time for the procedure, which may be an action performed by a person using a computer, performing the procedure, which may be an action performed by a person alone, providing post procedure care, which may be an action performed by a person alone, and/or scheduling follow up appointments, which may be an action performed by a person using a computer.

Design elements 206 may also include one or more data definitions that define, at least in part, data associated with the software application. A data definition may define data associated with specification 204. For example, data associated with a specification 204 that includes a software design 106 for a medical procedure may include the name, address, and telephone number of a patient, the date and time of the procedure, medical insurance numbers, the name of the medical procedure, the name of one or more doctors, and/or any other data or information associated with a medical procedure. A data definition may also include information about the type of data. Each datum may be a particular type of datum: for example, data that represents the name of a patient may be a string data type, the date of the procedure may be a date-time data type, the insurance policy number may be a numeric data type, etc. The data may include any type of data including simple data types, such as integers and characters, or complex data types, such as classes or databases, or any other type of data. The type of data may also include limits or restrictions of the data. For example, the length of data that represents the name of a patient may be limited to a maximum number of characters.

Design elements 206 may also include one or more data relationship definitions that define, at least in part, a relationship between the data. Data may be related to each other in various ways. A data relationship definition may also include information about the type of data relationship. For example, data may reference other data, data may link to other data, data may be identical to other data, data may be part of the same process, data may be part of the same user interface, data may be part of the same application, data may be dependant on each other, data may be used to generate or derive additional data, data may be an encoding of other data, data may be an input to a process action that may formulate additional output data, etc. The relationship between the data may be any type of data association or relationship. Additionally, data may be associated with other data via a data organization structure, such as a database, XML file, or other structured data organization. Design elements 206 may include a cardinality of the data relationship. For example, an occurrence of a first datum may be related to many occurrences of a second datum. Other cardinality relationships may include a many to one relationship, a one to one relationship, and a many to many relationship, for example. As a specific example, a first group of data may be one or more images taken from an echocardiogram procedure. A second group of data may be information about the patient who underwent the echocardiogram procedure. One or more design elements 206 may define a relationship between groups of data. Continuing the example, one group of data may include patient information and another group of data may include echocardiogram images. The relationship between the groups of data may be an association one patient to many echocardiogram images, for example. The association may take various forms including, but not limited to, a cardinality, i.e. a one to many relationship-one patient to many echocardiogram images, for example. Although a specific example is described, one skilled in the art will recognize that design elements, such as design elements 206, may include any type of data relationship.

Design elements 206 may also include one or more user interface definitions that define, at least in part, an interface to the software application. A specification, such as specification 204, may define a user interface. Design elements 206 may provide a user interface definition. A user interface definition may include one or more definitions of one or more user interface ("UI") elements of a user interface. The UI elements, as a whole or in part, may define and/or describe a portion of a user interface or a complete user interface. For example, design elements 206 may include one or more UI elements that define, at least in part, a type of a UI instance, including, but not limited to, a window, a web page, a report, etc. Further, design elements 206 may include one or more UI elements that define, at least in part, the content of a UI instance, such as a button portion of a web page or window. The definition of the button portion may include information about the size, location, text, color, functionality, or any other information associated with the button. Design elements 206 may include UI elements including, but not limited to: a window, a text box, a panel, a label, a tab panel, a scroll box, a dial, a menu, a menu item, a toolbar, a drop-down box, a checkbox, a radio button, a graphic or picture, etc. Design elements 206 may include various types of user interface information and/or user interface definitions. For example, one or more design elements may include a definition of a complete user interface. As another example, design elements 206 may include a definition of one or more UI elements, such as a UI button or UI menu. As another example, one or more design elements may include information about one or more user interfaces and/or information about one or more UI elements, such as a user interface color or a UI element location, for example. As another example, design elements 206 may include information about one or more UI elements including, but not limited to, a display format of a UI element. A display format may include the formatting of a web page, report, email, or data to be presented or captured. A display format may also include the order or sequence in which data is to be presented, the data relationships between the data presented (e.g. the cardinality relationship between data), or whether a datum is to be input by the user or displayed by the software application. In general, design elements 206 may include information about any type of display formatting of a UI element.

Design elements 206 may also include one or more rules that may be applied to one or more design elements of specification 204. For example, design elements 206 may define a rule or set of rules that verifies or validates other design element(s) 206. One or more rules may be used to validate and/or check, at least in part, one or more design elements, e.g. design elements 206 contained in specification 204. A rule may, for example, be used to validate and/or check a process action.

The one or more rules may contain one or more rules and/or limits to which the process action must adhere. For example, the one or more rules may contain a specific order of process actions to be taken when scheduling a medical procedure. The one or more rules may be used to ensure that the process actions adhere to the specific order required, for example. One or more rules may also provide information used to validate and/or check a process action. For example, if a process action includes the action of setting a date and time for a medical procedure, the one or more rules may be used to ensure that the setting of a date and time actually takes place and is included as part of the process action. Additionally or alternatively, the one or more rules may be used to ensure that the date and time of for the medical procedure are a valid date and time, for example. The one or more rules may also provide information used to validate and/or check a data definition. For example, if a data definition defines a medical insurance number, the one or more rules may be used to ensure that the insurance number is a valid insurance number. As another example, the one or more rules may be used to ensure that the insurance number conforms to a particular pattern, such as a maximum length, a required combination of alpha and numeric characters, or a required pattern of spaces or dashes between numbers, for example. The rules may also provide information used to validate and/or check one or more data relationships between data. For example, if a data relationship requires that a first data and second data are identical, the one or more rules may include the requirement that the first and second data be identical, or may provide information used to ensure that the first and second data are identical, for example. The rules may also create additional restrictions upon a data relationship. For example, if data represents a hysterectomy, there may be a requirement within specification 204 and/or design elements 206 that an associated patient is female. Accordingly, design elements 206 may include a rule used that ensures the patient associated with the hysterectomy is female, for example.

Design elements 206 may also include an order of presentation of data elements in a user interface. The order of presentation may include information about an organization of data elements or relationships between data. The information may include a method of sorting, filtering, displaying, or processing data elements or relationships between data elements, for example. As an illustration, the order or sequence of presentation may direct a software application to present data in an ascending order. Alternatively, the order or sequence of presentation may direct a software application to filter data where the value of the data is less than a particular threshold.

Design elements 206 may also include various other elements and/or rules associated with the software application. These elements and/or rules may include: a data validation rule that may be used to validate data of the software application; a data derivation rule that may be used to derive data (e.g. an algorithm to calculate a total cost as a product of a unit price times a quantity); a data access rule that may define access to data, such as read access, write access, etc.; a process action user interface element that may define, at least in part, a user interface element associated with a process action; a process action entry condition that may define a condition that must be met in order to start or trigger a process action; a process action exit condition that may define a condition required to exit, terminate, or end a process action; a process action data rule that may define a rule associated with data associated with a process action—the process action data rule may include qualification, filtering, and/or sorting rules, for example; and a process action exception handing rule that may handle an exception associated with a process action.

Various other data may also be included within design elements 206. Such data may include an organization chart. The organizational chart may define an organizational structure and reporting hierarchy of an organization, for example. An organizational chart may also include information about elements within the organization chart. For example, if the organizational chart contains information about people within an organization, design elements 206 may include information about the people within the organization including name, location, contact information, position information, etc.

Design elements 206 may also contain information about a work location that identifies, at least in part, a physical work facility. The work location may include facility information such as address, size, cost, capacity, occupancy, ownership, and/or any other information associated with a physical work facility.

As stated, software design analysis process 102 may receive 202 one or more specifications 204 containing one or more design elements 206. Receiving one or more specifications 204 may occur in various ways. For example, if specification 204 is a file or set of files stored on a storage device (e.g. storage devices 120, 122, 124, 126), software design analysis process 102 may read specification 204—in part or in its entirety—from the storage device. Additionally/alternatively, if specification 204 is a data stream or transmission, software design analysis process 102 may read specification 104 via the data stream or transmission. As a further example, software design analysis process 102 may receive specification 204 and/or software design 106 via user input. For example, a user may enter (e.g. with mouse and keyboard) specification 204 and/or software design 106 into a computing device (e.g. server computer 104). Accordingly, software design analysis process 102 may receive specification 204 and/or software design 106 through user input.

Software design analysis process 102 may also identify 208 one or more design elements 210 not included in the one or more specifications. Identifying 208 the one or more design elements not included in the one or more specifications may include analyzing event triggers associated with one or more process actions. As stated, design elements 206 may include process actions. A trigger may be an event that is raised to initiate a process action or terminate a process action, for example. Accordingly, a trigger may be associated with a process action. A design element 206 may include a process action that expects to receive a trigger or expects to initiate a trigger. Software design analysis process 102 may identify design elements 210 not included in specification 204 by analyzing triggers associated with design elements 206, 210. For example, an existing design element 206 may include a process action that raises a trigger and initiates a second process action. Accordingly, software design analysis process 102 may determine that the second process action (the action initiated by the trigger) should exist within specification 204 and/or software design 106. However, specification 204 and/or software design 106 may not include the second process action (the action initiated by the trigger). Software design analysis process 102 may then identify 208 the second process action as a design element 210 not included in specification 204, for example. Similarly, software design analysis process 102 may identify 208 design elements 210 not included in specification 204 by identifying 208 design elements 206 within specification 204 that expect to receive triggers, but for which no triggers exist within specification 204. For example, a design element 206 may include a process action that expects to receive a particular trigger. If no design element 206 within specification 204 includes the particular trigger, software design analysis process may, for example, determine that a process element is missing from specification 204 and identify 208 the missing design element as a design element 210 not included in specification 204.

Software design analysis process 102 may also identify 208 one or more design elements 210 not included in the one or more specifications by analyzing data captured by one or more process actions. A process element included in design elements 210 may utilize data and/or expect to receive data. Additionally and as stated, a design element 210 may include a data and/or a data definition. Software design analysis process may identify 208 design elements 210 not included in specification 204 by determining that a design element 206 that exists within specification 204 expects to receive particular data and that no design element within specification 204 can provide the particular data. For example, if software design 106 describes a software application for a medical procedure, design elements 206 may include a process action that expects to receive a doctor's schedule. However, if no design element 206 within specification 204 includes a process action, rule, UI definition, or data that can provide a doctor's schedule, software design analysis process 102 may identify 208 that design element 210 that is missing from specification 204. Additionally/alternatively, software design analysis process 102 may identify 208 a design element 210 that is missing from specification 204 by determining that data exists within specification 204 that should be processed. For example, specification 204 may include a design element that provides raw financial trading data. Additionally, specification 204 may include a design element that presents processed financial data in a UI. However, software design analysis process 102 may determine that no design element exists within specification 204 that can process and prepare the raw financial data for presentation within the UI. Software design analysis process 102 may identify 108 a missing design element 210 by analyzing the type, form, content, or any other attribute of data to identify 208 a design element 210 not included in specification 204. For example, if a design element 206 expects a date/time data type, but no existing design element 206 can provide a date/time data type, software design analysis process 102 may identify 108 a design element 210 not included within specification 204 that provides date/time data.

Software design analysis process 102 may also identify 208 one or more design elements 210 not included in the one or more specifications by generating 216 metrics associated with design elements of the specification and/or generating metrics associated with data captured by one or more process actions. If design elements 206 expect to expect to provide or receive particular data or triggers, software design analysis process 102 may generate 216 metrics associated with the data or triggers. Software design analysis process 102 may also generate 216 metrics associated with UI definitions, rules, or any other data or information within specification 204. For example, if design elements 206 are configured to provide a particular trigger, software design analysis process 102 may generate 216 metrics and/or measurements associated with the trigger including, but not limited to: a number of design elements 206 that are configured to provide the particular trigger, a number of instances of the particular trigger event, a number of design elements 206 configured to receive the particular trigger, an importance of the trigger to the software application, a severity of the trigger to the software application, etc. In general, software design analysis process 102 may generate 216 any metric or measurement that may be associated with the trigger. Similarly, software design analysis process 102 may generate 216 metrics and/or measurements associated with data, UI definitions, rules, etc. Software design analysis process 102 may generate 216 a metric of the count, importance, severity, number of instances, number of design elements, etc., associated with any data, UI definitions, rules, process actions, etc., included in specification 204.

Software design analysis process 102 may utilize the metrics to identify 208 one or more design elements 210 not included in specification 204. For example, if software design analysis process 102 generates 216 metrics that measure a number of medical procedures performed, software design analysis process 102 may then determine whether a design element 206 that measures the number of medical procedures is included in specification 204. Further, other critical factors of medical scheduling may be analyzed, including but not limited to the types of medical procedures, the locations at which they were performed, the doctors performing them, etc. Continuing with the example, these factors may be combined (such as, the doctors performing a medical procedure in a location) to define additional metrics. Also, the metrics themselves may be subject to measurement of trends over time, which will generate 216 additional metrics. If software design analysis process 102 determines that design elements 206 do not include generated 216 metrics, software design analysis process may determine that different or additional design elements 210 are needed but are not included in specification 204. Additionally or alternatively, software design analysis process 102 may, for example, generate 216 metrics that tend to show that an event (such as a particular operational event) is a critical event and/or an important event for a software application because, for example, specification 204 may include a rule stating that all of the particular medical scheduling events must be handled within a particular time frame (e.g. two weeks) and given a high priority. Software design analysis process 102 may determine that design elements 206 are not sufficient to handle the particular operational event in the particular time frame. Accordingly, software design analysis process 102 may identify 208 design elements 210 not included in specification 204 by generating 216 and analyzing metrics associated with design elements 206 within specification 204.

One skilled in the art will recognize that various metrics may be used to determine whether various design elements 210 are not included in specification 204. Software design analysis process 102 may generate 216 metrics for data, user interface definitions, process actions, and rules, for example, and use those metrics to identify 208 whether design elements 210 are sufficient to handle, process, render, etc., the data, user interface definitions, process actions, rules, etc.

Software design analysis process may generate 212 the one or more design elements 210 not included in specification 204. As stated, design elements 206, 210 may be used to generate a software application. The design elements may be used to create, for example, units of code that may be included in the construction of a software application. The design elements may also include units of code that may be used in the construction of a software application. A unit of code may be software code that can be included in a software application (e.g. high level code such as C#, C++, Java, Python, etc.; low level code such as machine language or assembly language; script code such as JavaScript, Python, etc.; or any type of software code). Accordingly, if software design analysis process 102 identifies 208 design elements 210 not included in software specification 204, software design analysis process 102 may generate 212 the design elements 210 not included in specification 204. Generating 212 the design elements 210 not included in specification 204 may include generating units of code, generating instructions or data that may be used to create units of code, generating data, generating data definitions, generating UI elements and/or UI definitions, generating rules etc.

Generating 212 the design elements 210 not included in specification 204 may also include retrieving a pre-existing design element from a data store. For example, if software design 106 is a design for a medical software application, and software design analysis process 102 determines that specification 204 does not include a design element 210 that can raise an alarm when a patient enters a state of cardiac arrest, software design analysis process 102 may generate 212 the design element 210 not included in specification 204 that can raise the alarm when a patient enters a state of cardiac arrest. Software design analysis process 102 may, for example, generate 212 the design element 210 by retrieving a design element 210 that cat raise the alarm from a data store. Alternatively or additionally, software design analysis process 102 may generate a unit of code that can raise the alarm and/or generate 212 a design element 210 that can raise the alarm.

Accordingly, if software design analysis process 102 generates 212 design elements 210 not included in specification 204, software design analysis process 102 may add 214 the generated design elements 210 to specification 204. Software design analysis process 102 may, for example, append generated design elements 210 to specification 204, include generated design elements 210 in specification 204, or modify design elements 206 to include generated design elements 210. Software design analysis process 102 may also store specification 204, including design elements 206, 210, for later retrieval and use. Software design analysis process 102 may, for example, store specification 204 on a storage device (e.g. 120, 122, 124, 16), in a data store (e.g. data store 128), or in any form of storage medium.

A number of implementations have been described. Nevertheless, it will be understood that various modifications may be made. Accordingly, other implementations are within the scope of the following claims.

What is claimed is:

1. A method of analyzing a software design comprising:
receiving, by a processor, one or more specifications containing one or more design elements;
analyzing, by the processor, the one or more specifications to determine all possible design elements for the one or more specifications, wherein analyzing the one or more specifications to determine all possible design elements for the one or more specifications includes,
analyzing event triggers associated with one or more process actions included in the one or more specifications,
analyzing data captured by the one or more process actions included in the one or more specifications,
analyzing rules used by the one or more process actions included in the one or more specifications,
analyzing structures related to the one or more process actions included in the one or more specifications,
generating combinations of analyzed event triggers, data, process actions, rules, and structures contained in the one or more specifications,
identifying the possible design elements from the generated combinations of analyzed event triggers, data, process actions, rules, and structures associated with the event triggers associated with the one or more process actions,
identifying the possible design elements from the generated combinations of analyzed event triggers, data, process actions, rules, and structures associated with the data captured by the one or more process actions,
identifying the possible design elements from the generated combinations of analyzed event triggers, data, process actions, rules, and structures associated with the rules used by the one or more process actions,
identifying the possible design elements from the generated combinations of analyzed event triggers, data, process actions, rules, and structures associated with the structures related to the one or more process actions, and
identifying from the possible design elements all the possible design elements for the one or more specifications;
identifying, by the processor, one or more design elements not included in the one or more specifications;
generating, by the processor, the one or more design elements for the design elements not included in the one or more specifications; and
adding, by the processor, the one or more generated design elements to the one or more specifications.

2. The method of claim 1 further comprising storing the one or more specifications.

3. The method of claim 1 wherein identifying the design elements not included in the one or more specifications includes comparing the design elements included in the one or more specifications to the possible design elements for the one or more specifications.

4. The method of claim 1 wherein generating the design elements for the design elements not included in the one or more specifications includes:
determining whether data of the one or more generated design elements not included in the one or more specifications exists within the one or more specifications;
determining whether a process action of the one or more generated design elements not included in the one or more specifications exists within the one or more specifications;
determining whether a user interface of the one or more generated design elements not included in the one or more specifications exists within the one or more specifications; and
determining whether rules of the one or more generated design elements not included in the one or more specifications exists within the one or more specifications.

5. The method of claim 1 wherein generating the design elements for the design elements not included in the one or more specifications includes:
generating one or more data definitions that do not exist within the one or more specifications for the one or more design elements;

generating one or more process actions that do not exist within the one or more specifications for the one or more design elements;

generating one or more user interfaces that do not exist within the one or more specifications for the one or more design elements; and generating one or more rules that do not exist within the one or more specifications for the one or more design elements.

6. A computer program product residing on a non-transitory computer readable medium, having a plurality of instructions stored thereon which, when executed by a processor, cause the processor to perform operations comprising:

receiving one or more specifications containing one or more design elements;

analyzing the one or more specifications to determine all possible design elements for the one or more specifications, wherein analyzing the one or more specifications to determine all possible design elements for the one or more specifications includes, analyzing event triggers associated with one or more process actions included in the one or more specifications, analyzing data captured by the one or more process actions included in the one or more specifications, analyzing rules used by the one or more process actions included in the one or more specifications, analyzing structures related to the one or more process actions included in the one or more specifications, generating combinations of analyzed event triggers, data, process actions, rules, and structures contained in the one or more specifications, identifying the possible design elements from the generated combinations of analyzed event triggers, data, process actions, rules, and structures associated with the event triggers associated with the one or more process actions, identifying the possible design elements from the generated combinations of analyzed event triggers, data, process actions, rules, and structures associated with the data captured by the one or more process actions, identifying the possible design elements from the generated combinations of analyzed event triggers, data, process actions, rules, and structures associated with the rules used by the one or more process actions, identifying the possible design elements from the generated combinations of analyzed event triggers, data, process actions, rules, and structures associated with the structures related to the one or more process actions, and identifying from the possible design elements all the possible design elements for the one or more specifications;

identifying one or more design elements not included in the one or more specifications;

generating the one or more design elements for the design elements not included in the one or more specifications; and adding the one or more generated design elements to the one or more specifications.

7. The computer program product of claim 6 wherein the operations further comprise storing the one or more specifications.

8. The computer program product of claim 6 wherein identifying the design elements not included in the one or more specifications includes comparing the design elements included in the one or more specifications to the possible design elements for the one or more specifications.

9. The computer program product of claim 6 wherein generating the design elements for the design elements not included in the one or more specifications includes:

determining whether data of the one or more generated design elements not included in the one or more specifications exists within the one or more specifications;

determining whether a process action of the one or more generated design elements not included in the one or more specifications exists within the one or more specifications;

determining whether a user interface of the one or more generated design elements not included in the one or more specifications exists within the one or more specifications; and determining whether rules of the one or more generated design elements not included in the one or more specifications exists within the one or more specifications.

10. The computer program product of claim 6 wherein generating the design elements for the design elements not included in the one or more specifications includes:

generating one or more data definitions that do not exist within the one or more specifications for the one or more design elements;

generating one or more process actions that do not exist within the one or more specifications for the one or more design elements;

generating one or more user interfaces that do not exist within the one or more specifications for the one or more design elements; and generating one or more rules that do not exist within the one or more specifications for the one or more design elements.

11. The method of claim 1 wherein adding the one or more generated design elements to the one or more specifications includes:

adding one or more data definitions to the one or more specifications;

adding one or more process actions to the one or more specifications;

adding one or more user interfaces to the one or more specifications; and adding one or more rules to the one or more specifications.

12. The computer program product of claim 6 wherein adding the one or more generated design elements to the one or more specifications includes:

adding one or more data definitions to the one or more specifications;

adding one or more process actions to the one or more specifications;

adding one or more user interfaces to the one or more specifications; and adding one or more rules to the one or more specifications.

* * * * *